United States Patent
Onural

(10) Patent No.: US 10,379,496 B2
(45) Date of Patent: Aug. 13, 2019

(54) SYSTEM AND METHOD FOR DISPLAYING AND CAPTURING HOLOGRAPHIC TRUE 3D IMAGES

(71) Applicant: Levent Onural, Ankara (TR)

(72) Inventor: Levent Onural, Ankara (TR)

( * ) Notice: Subject to any disclaimer, the term of this patent is extended or adjusted under 35 U.S.C. 154(b) by 0 days.

(21) Appl. No.: 14/904,131

(22) PCT Filed: Dec. 8, 2014

(86) PCT No.: PCT/TR2014/000492
§ 371 (c)(1),
(2) Date: Jan. 11, 2016

(87) PCT Pub. No.: WO2016/093776
PCT Pub. Date: Jun. 16, 2016

(65) Prior Publication Data
US 2016/0161914 A1 Jun. 9, 2016

(51) Int. Cl.
*G03H 1/22* (2006.01)
*G03H 1/26* (2006.01)
(Continued)

(52) U.S. Cl.
CPC ........... *G03H 1/2294* (2013.01); *G03H 1/041* (2013.01); *G03H 1/0443* (2013.01); *G03H 1/0465* (2013.01); *G03H 1/0808* (2013.01); *G03H 1/2205* (2013.01); *G03H 1/2286* (2013.01); *G03H 1/2645* (2013.01);
(Continued)

(58) Field of Classification Search
CPC .... G03H 1/2294; G03H 1/041; G03H 1/0443; G03H 1/0465; G03H 1/0808; G03H 1/2205; G03H 1/2286; G03H 1/2645; G03H 2001/0088; G03H 2001/0436; G03H 2001/221; G03H 2001/2236; G03H 2001/2239; G03H 2001/2271; G03H 2001/2297; G03H 2001/2655; G03H 2210/30; G03H 2223/17; G03H 2223/24;
(Continued)

(56) References Cited

U.S. PATENT DOCUMENTS 4,199,685 A * 4/1980 Hora ..................... B01D 59/34
250/423 P
4,229,761 A 10/1980 Thomas
(Continued)

FOREIGN PATENT DOCUMENTS

KR     20150097029     *  8/2015  ........... G03H 1/2294
WO     2012/095703 A1     7/2012

OTHER PUBLICATIONS

Wikipedia page Beam Splitters (Year: 2005).*
(Continued)

*Primary Examiner* — George G King
(74) *Attorney, Agent, or Firm* — Ladas & Parry LLP

(57) ABSTRACT

The present invention relates to a system and method for displaying and capturing holographic true 3D images. The system comprises elements which may form both a wide viewing angle holographic true 3D display and a holographic true 3D video camera. The system mainly comprises a light source, a spatial light modulator or an electro-optical capturing device in different embodiments of the invention, a curved mirror, a computer and a beam splitter and opaque mask in some embodiments of the invention.

11 Claims, 13 Drawing Sheets

(51) Int. Cl.
*G03H 1/04* (2006.01)
*H04N 13/257* (2018.01)
*H04N 13/324* (2018.01)
*G03H 1/08* (2006.01)
*G03H 1/00* (2006.01)

(52) U.S. Cl.
CPC ......... *H04N 13/257* (2018.05); *H04N 13/324* (2018.05); *G03H 2001/0088* (2013.01); *G03H 2001/0436* (2013.01); *G03H 2001/0452* (2013.01); *G03H 2001/221* (2013.01); *G03H 2001/2236* (2013.01); *G03H 2001/2239* (2013.01); *G03H 2001/2271* (2013.01); *G03H 2001/2297* (2013.01); *G03H 2001/2655* (2013.01); *G03H 2210/30* (2013.01); *G03H 2223/17* (2013.01); *G03H 2223/24* (2013.01); *G03H 2225/10* (2013.01); *G03H 2225/35* (2013.01)

(58) Field of Classification Search
CPC .......... G03H 2225/10; G03H 2225/35; H04N 13/0257; H04N 13/0422
USPC .......................................... 359/9–11; 472/61
See application file for complete search history.

(56) References Cited

U.S. PATENT DOCUMENTS

| | | | | |
|---|---|---|---|---|
| 6,115,121 | A * | 9/2000 | Erskine | G01J 3/453 356/28.5 |
| 6,266,176 | B1 * | 7/2001 | Anderson | G02B 27/0087 359/237 |
| 6,466,372 | B1 * | 10/2002 | Morris | G03H 1/22 359/11 |
| 6,478,432 | B1 * | 11/2002 | Dyner | G02B 27/2292 345/175 |
| 7,738,151 | B2 | 6/2010 | Garner et al. | |
| 2002/0164054 | A1 * | 11/2002 | McCartney | A61B 5/1176 382/118 |
| 2004/0174539 | A1 * | 9/2004 | Tyczka | G01B 11/254 356/603 |
| 2007/0023079 | A1 * | 2/2007 | Mills | F24J 2/06 136/246 |
| 2008/0198431 | A1 | 8/2008 | Schwerdtner | |
| 2009/0147159 | A1 * | 6/2009 | Chen | H04N 9/3108 349/8 |
| 2010/0284049 | A1 | 11/2010 | Buschbeck et al. | |
| 2011/0002019 | A1 * | 1/2011 | Routley | G02B 27/48 359/9 |
| 2012/0050459 | A1 * | 3/2012 | Yoon | G02B 27/22 348/40 |
| 2012/0224062 | A1 * | 9/2012 | Lacoste | G01C 21/365 348/148 |
| 2014/0033052 | A1 | 1/2014 | Kaufman et al. | |
| 2014/0036329 | A1 | 2/2014 | Kang et al. | |
| 2014/0300695 | A1 * | 10/2014 | Smalley | G02F 1/011 348/40 |
| 2015/0234350 | A1 * | 8/2015 | Park | G03H 1/2294 359/9 |

OTHER PUBLICATIONS

Olewitz "Korean scientists have developed a legitimate 3D hologram you can view from any angle" posted at https://www.digitaltrends.com/cool-tech/researchers-develop-real-floating-3d-hologram/ (Year: 2015).*

Benzie, P., et al., "A Survey of 3DTV Displays: Techniques and Technologies", IEEE Transactions on Circuits and Systems for Video Technology, vol. 17, No. 11, Nov. 2007, pp. 1647-1658.

Yaras, F, et al., "State of the Art in Holographic Displays: A Survey", Journal of Display Technology, vol. 6, No. 10, Oct. 2010, pp. 443-454.

Onural, L, et al., "Digital Holographic Three-Dimensional Video Displays", Proceedings of the IEEE, vol. 99, No. 4, Apr. 2011, pp. 576-589.

Sahin, E., et al., "Calculation of the scalar diffraction field from curved surfaces by decomposing the three-dimensional field into a sum of Gaussian beams", J. Opt. Soc. Am. A, vol. 30, No. 8, Mar. 2013, pp. 527-536.

Onural, L., et al., "Signal processing issues in diffraction and holographic 3DTV", Signal Processing: Image Communication, vol. 22, No. 2, Feb. 2007, pp. 169-177.

Yontem, A. O., et al., "Integral imaging using phase-only LCoS spatial light modulators as Fresnel lenslet arrays", J. Opt. Soc. Am. A, vol. 28, No. 11, Nov. 2011, pp. 2359-2375.

E. Stoykova et al: "3-D Time-Varying Scene Capture Technologies—A Survey", IEEE Transactions On Circuits And Systems For Video Technology, IEEE Service Center, Piscataway, NJ, US, vol. 17, No. 11, Nov. 1, 2007 (Nov. 1, 2007), pp. 1568-1586, XP011196191, ISSN: 1051-8215, DOI: 18.1109/TCSVT .2007.909975 cited in the application paragraph [001V]; Figure 3.

E. Stoykova et al: "Visible reconstruction by a circular holographic display from digital holograms recorded under infrared illumination", Optics Letters, Optical Society of America, US, vol. 37, No. 15, Aug. 1, 2012 (Aug. 1, 2012), pp. 3120-3122, XP001577490, ISSN: 0146-9592, DOI: 10.1364/ 0L .37.003120 [retrieved on Jul. 20, 2012] the whole document.

* cited by examiner

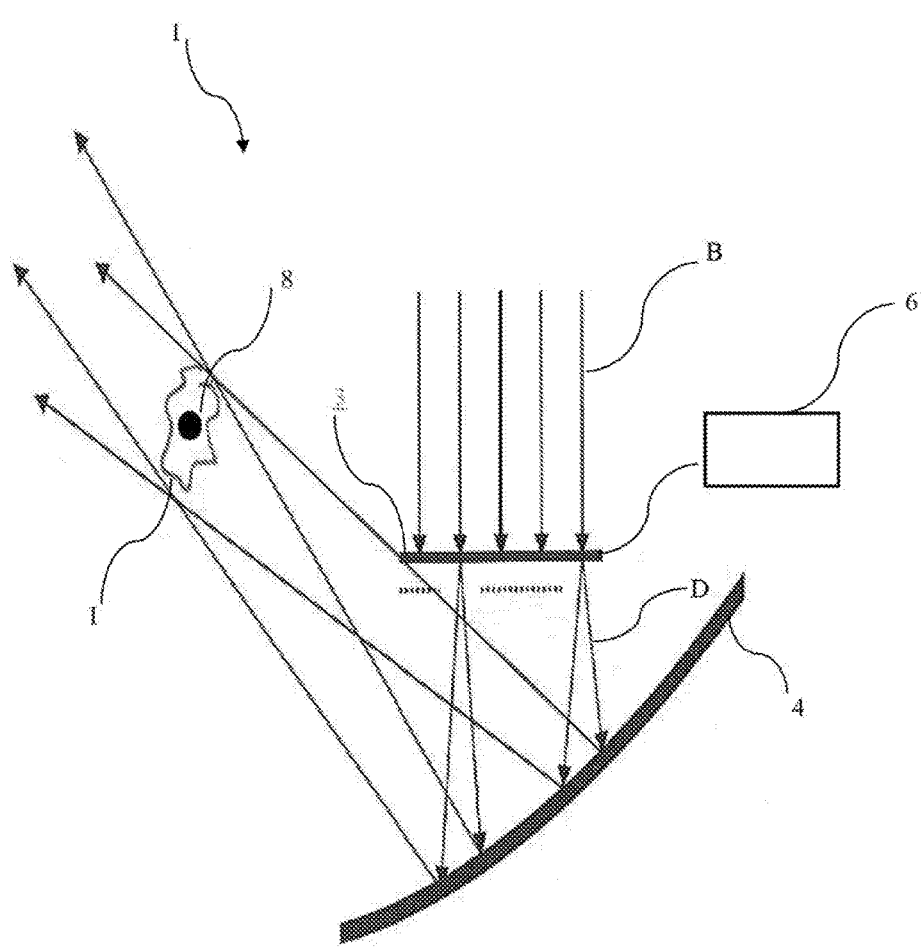

SYSTEM AND METHOD FOR DISPLAYING AND CAPTURING HOLOGRAPHIC TRUE 3D IMAGES

CROSS-REFERENCE TO RELATED APPLICATION

This U.S. application claims priority under 35 U.S.C 371 to, and is a U.S. National Phase application of, the International Patent Application No. PCT/TR2014/000492, filed 8 Dec. 2014, the disclosures of which are incorporated in their entirety by reference herein.

FIELD OF THE INVENTION

The present invention relates to a system and method for displaying and capturing holographic true 3D images. The system comprises elements which may form both a wide viewing angle holographic true 3D display and a holographic true 3D video camera.

BACKGROUND OF THE INVENTION

True 3D video displays target physical duplication of volume filling light of a scene. If a perfect duplication can be achieved, any observer, human or not, interacting with the duplicate light will see an exact ghost-like duplicate of the original scene. Most of the techniques commonly used today for 3D video are based on stereoscopic technique, as in commercial 3D movies. Even though multi-view video techniques are better than stereoscopy, these techniques are still far from ideal true 3D. The only true 3D technique is the holography. An overview of different 3D display techniques can be found in P. Benzie, J. Watson, P. Surman, I. Rakkolainen, K. Hopf; H. Urey, V. Sainov and C. von Kopylow, "A Survey of 3DTV Displays: Techniques and Technologies", IEEE Tran. on Circuits and Systems for Video Technology, vol 17, no 11, pp 1647-1658, November 2007. A survey on existing holographic displays can be found in F. Yaras, H. Kang and L. Onural, "State of the Art in Holographic Displays: A Survey", J. of Display Technology, vol 6, no 10, pp 443-454, October 2010.

One of the major problems of the state-of-the art electroholographic video cameras or displays is the required high spatial bandwidth (resolution) of the underlying electro-optical device. Holographic patterns are typically complicated fringe patterns where the fringes have very fine details; the detail is in the order of the wavelength and therefore, is in the micrometer range for optical holography. In addition to the high spatial bandwidth, a rather large size, ranging from a few square centimeters to many square decimeters, is needed for a satisfactory viewing experience. Such a fine resolution over a rather large area means a very large space-bandwidth product. Therefore, for a digital display, the device on which the holograms are electronically written must have very small pixel sizes (in the order of micrometers) that in turn, brings the number of such pixels to the order millions per square millimeter of the device. The same is also true for the camera: the electro-optical capturing device that captures the holographic fringe pattern must have a high spatial bandwidth (resolution) and a very large space-bandwidth product. The difficulty in the design and manufacturing of such high-resolution display or capture devices is one of the main obstacles that prevent consumer quality holographic video displays.

The effect of the resolution on the display is one of the important issues to consider and it can be analyzed as given in L. Onural, F. Yaras and H. Kang, "Digital Holographic Three-Dimensional Video Displays", Proc. of the IEEE, vol 99, no 4, pp 576-589, April 2011. Simply, each small patch on the display device is a local diffractor that distributes the incident light to different directions as it passes (transmissive case) or reflects (reflective case) from that patch. The resolution is directly related to the diffraction angle: larger resolutions result in finer patterns which in turn result in larger diffraction angles; therefore, a large resolution is needed to distribute outgoing light within a larger angle. The size of this angle also determines the viewing angle of the observer. The same is also true for capture devices: larger angles of incidence results in high resolution fringes to capture. Therefore, the resolution, both at the display or the capture, is directly related to viewing and capturing angles.

A parabolic mirror based image capture and display was disclosed in U.S. Pat. No. 4,229,761 in 1980. In that patent what the camera captures, after reflection from a parabolic mirror, is still the conventional video (intensity of light after it passes through a lens is captured), and not the fringe patterns as in a holographic capture device. The information carried by the captured intensity of light is not sufficient for a successful 3D operation. The system disclosed in U.S. Pat. No. 4,229,761 yields 2D intensity images floating in the air as a real image from a parabolic mirror. These floating 2D images may be well-focused, or may contain out-of-focus blurred areas, depending on the aperture of the camera as in conventional photography/video. The device here in this invention also has a concave mirror and an image capture device at the camera side, and a concave mirror and a display device at the display side, but both the capture and display techniques are different (holographic versus conventional video) and the relative location and the geometry of the capture and the display devices with respect to the mirror are different. Here in this invention the holographic capture and display devices cover a large area of the aperture of the paraboloid mirror, where in the camera and projection devices in U.S. Pat. No. 4,229,761 have conventional smaller size lens apertures.

A projection device having a coherent light beam-generator that generates a light beam and a beam expander disposed to receive the light beam and to emit an expanded light beam was disclosed in U.S. Pat. No. 7,738,151. The projection device disclosed in U.S. Pat. No. 7,738,151 also includes a digital micro-mirror device disposed to receive a holographic transform of an original image and to display the holographic transform for illumination by the expanded light beam into a holographic light beam with a convergent or focusing lens disposed to receive and modulate the holographic light beam and a liquid crystal plate volumetric image reconstructor that receives the focused holographic light beam and emits a 3-dimensional holographic image of the original image. The projection device disclosed in U.S. Pat. No. 7,738,151 is capable of generating true 3D images of only the synthetic (computer-generated) 3D scenes. Said projection device needs "image reconstructor", and therefore, does not attempt to replicate the physical volume filling light distribution. Instead of that, what is achieved by the invention in U.S. Pat. No. 7,738,151 is commonly called as "volumetric display" in the literature. Therefore, although the U.S. Pat. No. 7,738,151 discloses a holographic projector, the scope of the invention disclosed in that document is different than the invention disclosed in detailed description part of this document.

OBJECTS AND SUMMARY OF THE INVENTION

The object of the invention is to provide a system and a method for overcoming the problem of high-resolution requirement to achieve wider diffraction angles, by incorporating a curved mirror device. As a consequence of the geometry that includes such mirrors, large capture and viewing angles are made possible even if a rather low resolution capture or display device is employed.

The invention provides a system which may be used for both displaying and capturing holographic true 3D images. The display and camera models of the system are reciprocal models; therefore, description of one of them is also valid for the other one, provided that the direction of the flow of the light is reversed.

The invention also provides a method which is for writing fringe patterns on a spatial light modulator of a system which is used for displaying holographic true 3D images.

As will be apparent to one of skill in the art, the operations disclosed herein may be implemented in a number of ways, and such changes and modifications may be made without departing from this invention and its broader aspects. Other aspects, features, and advantages of embodiments of the present invention, as defined solely by the claims, will become apparent in the non-limiting and detailed description set forth below.

DETAILED DESCRIPTION OF THE INVENTION

The following sets forth a detailed description of the best-contemplated mode for carrying out the invention. The description is intended to be illustrative of the invention and should not be taken to be limiting.

"A System and Method for Displaying and Capturing Holographic True 3D Images" realized in order to fulfill the objects of the present invention is illustrated in the attached figures, where:

FIG. 6 shows a cross-sectional view of a holographic true 3D display in accordance with an embodiment of the invention, in which an opaque mask is used.

Figure 1:
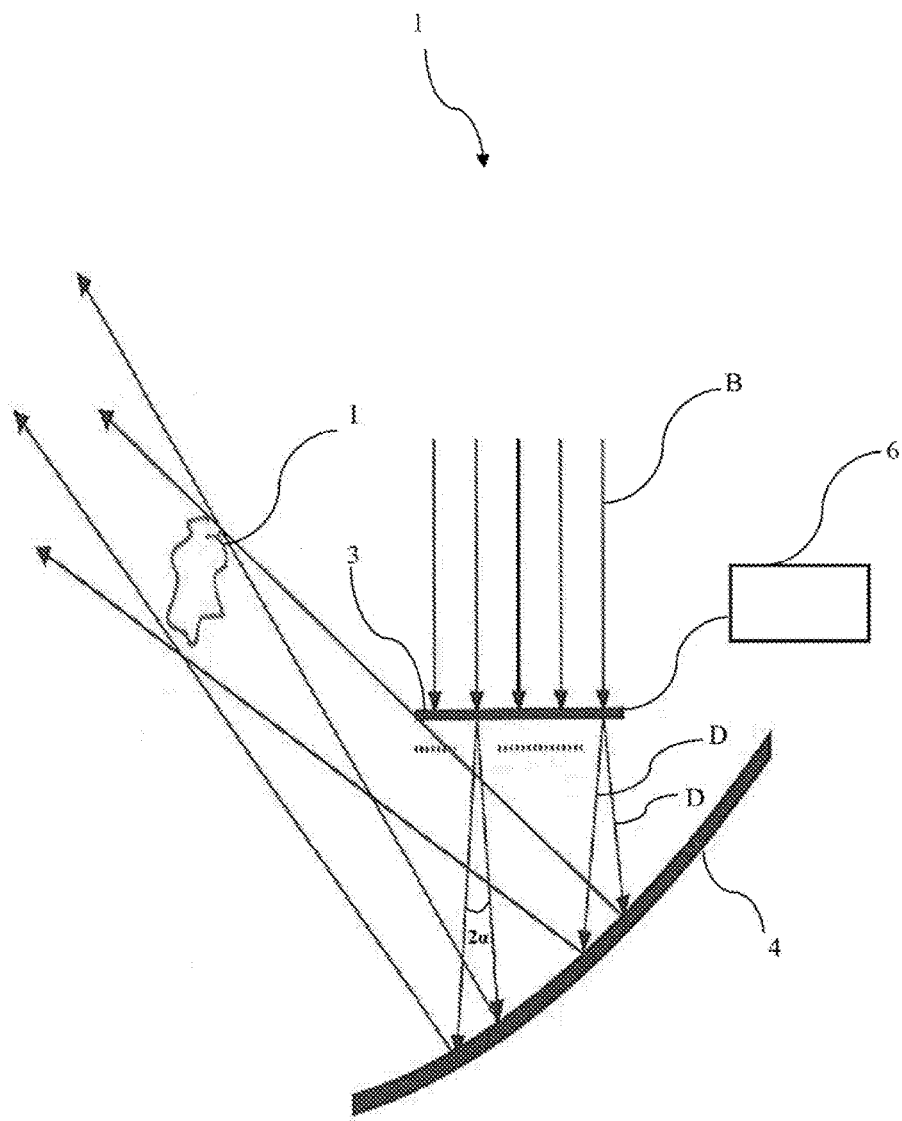
FIG. 1 shows a cross-sectional view of a holographic true 3D display in accordance with an embodiment of the invention in which the spatial light modulator is a transmissive spatial light modulator.

Elements shown in the figures are numbered as follows:
1. System
2. Light source
3. Spatial light modulator
4. Curved mirror
5. Electro-optical capturing device
6. Computer
7. Beam splitter
8. Opaque mask
100. Method
B. Incident beam
C. Conic mirror
D. Diffracted beam
I. True 3D image
M. Mirror
T. Target object A system (1) which operates as holographic true 3D display comprises;
   at least one light source (2) for providing source light beam,
   at least one spatial light modulator (3) optically coupled to a light source (2), the spatial light modulator (3) comprising one or more fringe patterns and configured to diffract light from the light source (2) that is incident upon the spatial light modulator (3),
   at least one curved mirror (4) optically coupled to the spatial light modulator (3), the curved mirror (4) configured to reflect diffracted beam (D) from the spatial light modulator (3) that is incident upon the curved mirror (4),
   at least one computer (6) which controls the spatial light modulator (3) by generating and processing electronic driving signals and transmitting signals to spatial light modulator (3).

In an embodiment of the invention, the system (1) that operates as holographic true 3D display further comprises a beam splitter (7).

"Spatial light modulator (3)" or "SLM (3)" refers to devices known to those of ordinary skill in the art that modulate an incident light beam.

The system (1) is configured to produce a true 3D image (I) about a focal point of the curved mirror (4), in an embodiment of the invention.

FIG. 1 is a schematic diagram depicting the system (1) for holographic true 3D display model. A collimated coherent light beam from a light source (2) uniformly illuminates the electronically driven large-area but rather low-resolution planar spatial light modulator (3). The direction of illumination (incidence angle of the illuminating beam) is perpendicular to SLM (3) surface, and therefore, the phase of the incident beam (B) over the SLM (3) is uniform.

SLM (3) is an element controlled by a computer (6) that means electronic driving signals are generated by computer (6) and transmitted to SLM (3).

Computer (6) is any electronic circuit, such as a digital signal processor, that has the ability of generating and processing electronic driving signals and transmitting the signals to SLM (3).

Computer (6) is the device, which conducts the procedures for determining the optical fringe pattern to be written on SLM (3) and writing the pattern to SLM (3).

SLM (3) is either a reflective spatial light modulator or a transmissive spatial light modulator. This simple geometry shown in FIG. 1 includes the transmissive SLM (3) while the FIG. 2 includes the reflective SLM (3), for a concave paraboloid mirror.

In the preferred embodiment of the invention, the SLM (3) alters both the amplitude and the phase of the incident light independently at every point on its planar surface as the light beam (B) passes through (for transmissive SLM (3)) or reflects from (for reflective SLM (3)) it, as controlled by the electronic driving signals generated by computer (6) and transmitted by computer (6) to SLM (3). In an embodiment of the invention, SLM (3) at its each surface point modulates at least one of the magnitude or phase of the incident light beam (B). The modulated light continues to travel towards a large size curved mirror (4) mounted at a distance from the SLM (3). In different embodiments of the invention, curved mirror (4) forms a surface segment of paraboloid, ellipsoid or spherical shape. The light is then reflected by the curved mirror (4), further propagates and forms the ghost-like true 3D image (I) around the focal point of the curved mirror (4).

The choice of the volume around the focal point for the resultant true 3D image (I) is directly related to the technical merits of this disclosed invention: For the paraboloid mirror (4) case, if the SLM (3) does not at all modulate the incoming light, in other words if the incident uniform beam (constant phase throughout the SLM (3) surface) passes through the SLM (3) unaltered, the result will be a sharp bright spot at the focal point of the curved mirror (4), since this geometry corresponds to parallel beam illumination of a paraboloid mirror (4) by a beam propagating parallel to its principal axis. By writing fringes on the SLM (3) to diffract the light, it is possible to move this bright spot around the focal point; rather slow varying fringes (low spatial frequencies) move the bright spot a little around the focal point, whereas, faster varying fringes (high spatial frequency) are needed for larger deviations from the focal point. Therefore, the need to write high-frequency fringes on the SLM (3) is avoided by restricting the resultant true 3D image (I) around the focal point. Video operation is achieved by writing a time-varying diffraction pattern on the SLM (3).

Figure 2:
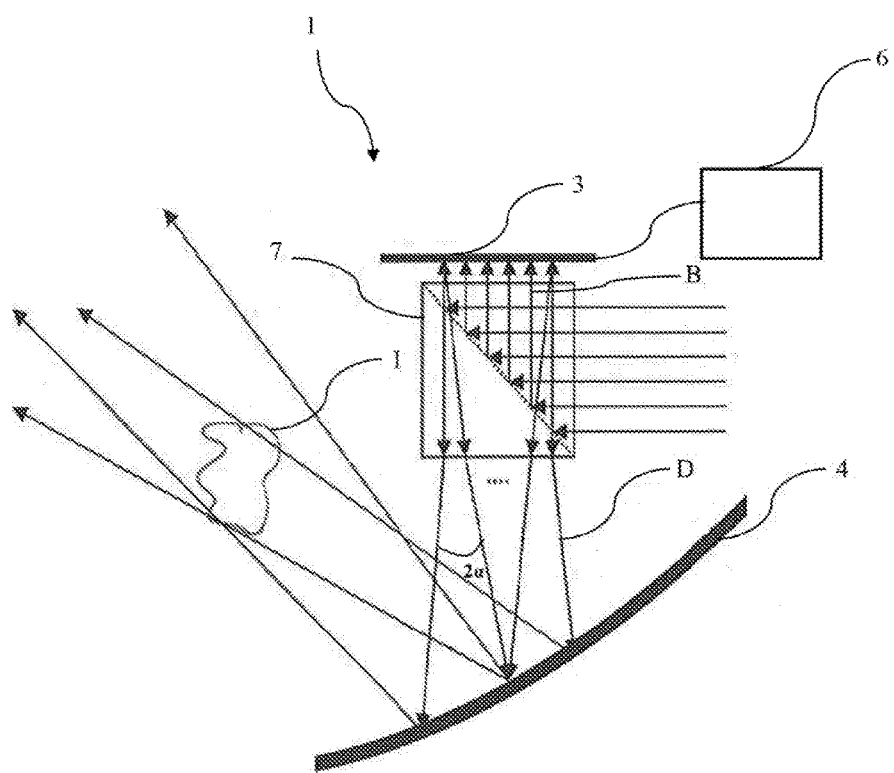
FIG. 2 shows a cross-sectional view of a holographic true 3D display in accordance with an embodiment of the invention in which the spatial light modulator is a reflective spatial light modulator.

FIG. 2 is a schematic diagram depicting the system (1) for holographic true 3D display model, with a reflective SLM (3). In the reflective SLM (3) case, incident light beam (B) passes through a beam splitter (7). The beam splitter (7) is used to guide the incoming beam to the reflective SLM (3) surface; the diffracted beam (D) from the surface of SLM (3) then passes through the same splitter towards the paraboloid mirror (4). Said beam splitter (7) includes an axis of rotational symmetry for rotationally symmetric illumination of the SLM (3). If the SLM is mounted in a tilted manner, then the beam splitter (7) has an inner conical surface and an outer conical surface.

To show that even small maximum diffraction angles by the SLM (3) due to its low spatial resolutions still yield a large and high quality optical viewing as a consequence of this invention, a simple analysis as depicted in FIG. 1 might be performed where the SLM (3) is a transmissive one and curved mirror (4) is a paraboloid concave mirror. Each hypothetical local patch on the SLM (3) can diffract the light at most by a small angle (plus minus alpha) and therefore the outgoing light cone has a small footprint on the curved mirror (4) surface. The undiffracted component of the outgoing beam (that is, the component that goes out from the SLM (3) perpendicularly along the axis) is diffracted towards the focal point of the paraboloid mirror (4). This is true for each different patch location on the SLM (3). The narrow cone, which represents the geometric limits of the diffracted beam (D) out from an SLM (3) patch, passes through the focal point of the paraboloid mirror (4), spanning a quite limited solid angle around the focal point. However, light components coming from small patches on different parts of the SLM (3) reach the surface of the paraboloid mirror (4) at different locations, and therefore, continue toward the focal point from different angles. The collection of such cones, each coming from a different hypothetical patch on the SLM (3) surface simultaneously, represents a concentration of light around the focal point of the curved mirror (4). Holographic operation, and therefore a 3D true display is achieved, when that light which continues to propagate to the 3D space after being concentrated around the focal point as described is a duplicate of the light that would come directly from a physical 3D object located around the focal point. Even though the SLM (3) is low resolution, and therefore, the light cone as depicted in the pictures is narrow, the collection of all such cones from the entire surface of the SLM (3) yields a true 3D image (I) which can be viewed from a much wider angle; the typical viewing angle for the configurations depicted in FIGS. 1 and 2 is 360 degrees along the lateral direction (around the axis of the depicted paraboloid mirror (4); azimuth), and about 30 degrees along the vertical direction (towards the axis of the depicted paraboloid mirror (4); altitude), if the paraboloid mirror (4) is looking upward. A consequence of the proposed geometry is a high quality true 3D image (I) whose resolution is easily in the order of current 2D monitors, and can be viewed from any horizontal direction (360 degrees) within a wide vertical viewing angle. The only drawback could be the small size of the resultant true 3D image (I) compared to the physical extent of the SLM (3) and the paraboloid mirror (4). The result is a high-resolution, large viewing angle, ghost-like true 3D video display, even if the SLM (3) is low-resolution.

The system (1) possesses an axis of rotational symmetry.

In an embodiment of the invention, light source (2) may emit light which includes a plurality of colors and the system (1) is configured for color operation in a time-sequential manner or the SLM (3) includes color masked pixels.

In an embodiment of the invention, SLM (3) comprises an array of smaller size spatial light modulators.

In different embodiments of the invention, geometric shape of the SLM (3) is a plane or a segment of a conical surface.

A system (1) which operates as holographic true 3D video camera comprises;
  at least one curved mirror (4) which is configured to reflect the light reflected from the scene where the system (1) which operates as holographic true 3D video camera is aimed at,
  at least one electro-optical capturing device (5) optically coupled to the curved mirror (4), that can record spatio-temporal fringe-patterns formed by the incident coherent light,
  at least one computer (6) which receives signals captured by electro-optical capturing device (5) and generates and processes corresponding electronic signals.

In an embodiment of the invention, the system (1) which operates as holographic true 3D video camera further comprises a beam splitter (7) which is used to guide the incoming light beam to the electro-optical capturing device (5).

Figure 3:
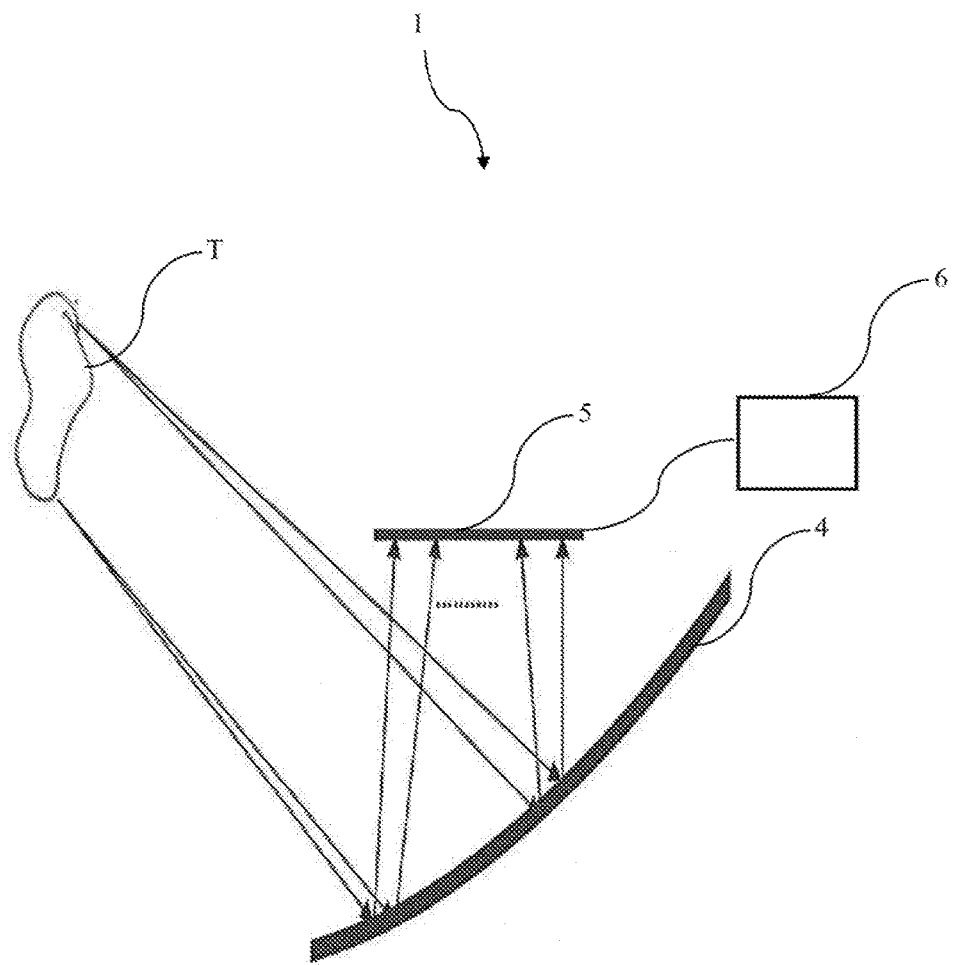
FIG. 3 shows a cross-sectional view of a holographic true 3D video camera in accordance with an embodiment of the invention.

FIG. 3 is the schematic diagram depicting the system (1) for holographic true 3D video camera model. The operation of this model is similar to holographic true 3D display model of the system (1), but the optical paths of the light beams are reversed.

In an embodiment of the invention, the system (1) that is in true 3D video camera mode in FIG. 3, receives light from a target object (T) that is located approximately at the focal point of the curved mirror (4) in a typical application. The incident coherent light from the target object (T) propagates first to the curved mirror (4) surface, and then towards the electro-optical capturing device (5). The spatio-temporal (as a consequence of the motion of the object) fringe patterns at the electro-optical capturing device (5) are the captured holographic video signal. Computer (6) receives said signals from electro-optical capturing device (5) and generates corresponding electronic signals.

In an embodiment of the invention, the system (1) that is in true 3D video camera mode in FIG. 3, receives light from a target object (T), that is located approximately at the focal point of the curved mirror (4) in a typical application.

Computer (6) is any electronic circuit, such as a digital signal processor, that has the ability of receiving signals from electro-optical capturing device (5) and generating and processing the corresponding electronic signals.

In the preferred embodiment, the curved mirror (4) is the same both for the holographic true 3D display and video camera models of the invention. Curved mirror (4) forms a surface segment of paraboloid, ellipsoid or spherical mirror in the holographic true 3D video camera model of the invention.

The SLM (3) at the display model and the electro-optical capturing device (5) at the video camera models have the same geometric structure in terms of the size and the number of pixels. Electro-optical capturing device (5) is configured to capture at least one of phase information or magnitude information of the spatio-temporal fringe patterns of the incident light.

In an embodiment of the invention, electro-optical capturing device (5) comprises an array of smaller size electro-optical capturing devices.

In an embodiment of the invention, the geometric shape of the electro-optical capturing device (5) is a plane, while in another embodiment of the invention it is a segment of a conical surface.

Figure 4:
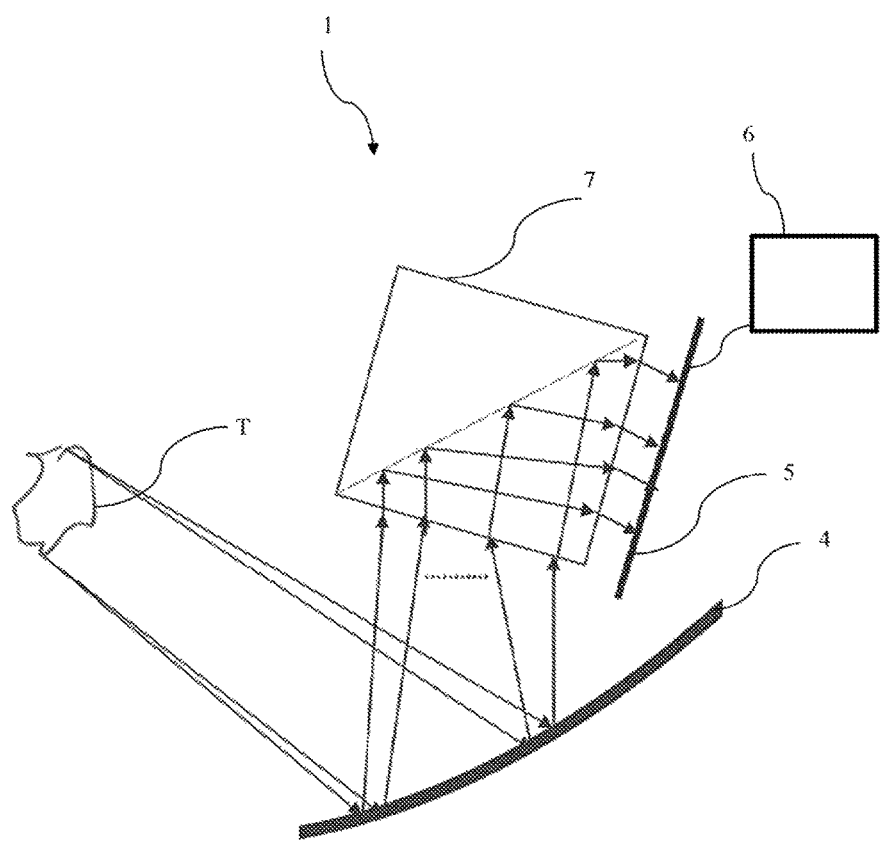
FIG. 4 shows a cross-sectional view of a holographic true 3D video camera in accordance with an embodiment of the invention in which the electro-optical capturing device is tilted and a beam splitter is used.
Figure 5A:
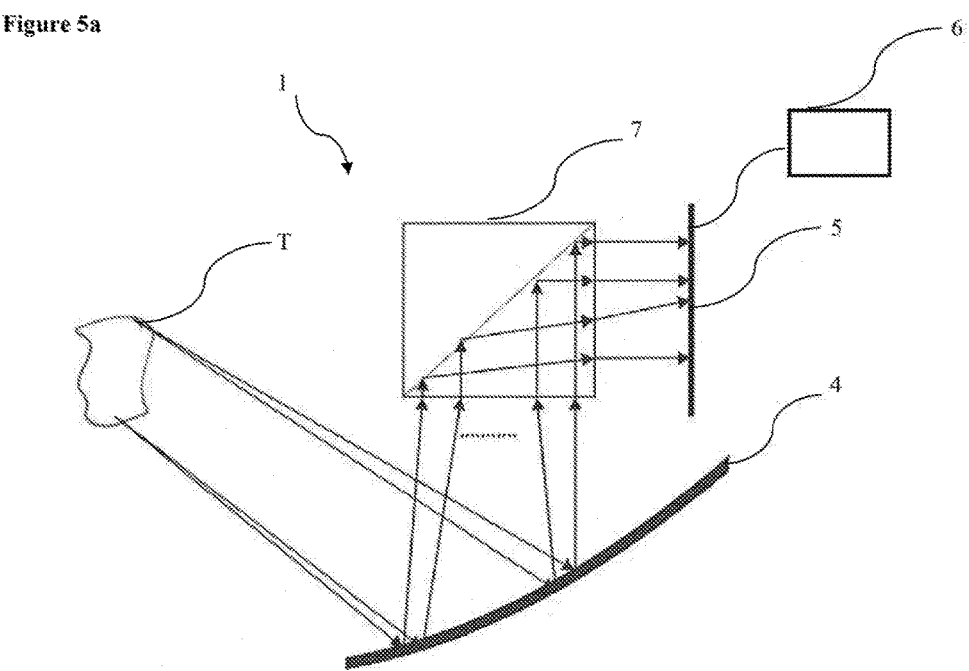
FIG. 5a shows a cross-sectional view of a holographic true 3D video camera in accordance with another embodiment of the invention in which a beam splitter is used.

FIG. 4 and FIG. 5a are schematic diagrams depicting the system (1) for holographic true 3D video camera model where curved mirror (4) is optically coupled to the target object (T) through a beam splitter (7). Said beam splitter (7) includes an axis of rotational symmetry for rotationally symmetric illumination of the electro-optical capturing device (5). In case of tilted mounting as depicted in FIG. 4, said beam splitter (7) also includes an inner conical surface and an outer conical surface.

The holographic true 3D display and video camera match can be better understood by the help of the commercial two-paraboloid mirror 3D image relay device called Mirage® (http://www.optigone.com/). This commercial device, and its various variants, consists of two identical paraboloid mirrors, looking face-to-face and their rims touch each other; the target object located around the focal point of one of the mirrors is optically relayed to the symmetric location around the focal point of the other mirror, generating a ghost 3D image. By assuming that a hypothetical plane passes through the touching rims of the two paraboloid mirrors, separating the two mirrors such that the two mirrors are not necessarily physically co-located anymore and capturing the complete physical properties (magnitude and phase) of the light over the hypothetical plane (2D) that covers the aperture of one of the mirrors as the light from a target object reflects from the mirror and then passes through the hypothetical plane, by the holographic electro-optical capturing device (5), the holographic true 3D video camera of the invention is achieved. At the display part of the invention, the same physical 2D complex valued (magnitude and phase) fringe pattern is written onto an SLM (3) located at the hypothetical plane that covers the aperture of the other mirror, and thus generates the same physical light that would generate the ghost-like 3D image via the reflection from the other paraboloid mirror. Any other hypothetical surface between the two paraboloid mirrors also works.

In an embodiment of the invention, mismatches during the capturing process for holographic true 3D video camera model can also be handled by processing the captured signals by conversion algorithms running on computer (6). In preferred embodiment of the invention, the electro-optical capturing device (5) captures both the magnitude and the phase of the incoming light from a target object (T). If both the magnitude and the phase of the incoming light from a target object (T) can not be captured by the electro-optical capturing device (5) because of its physical limitations, any other holographic capture method in the state of the art, for example, the one in E. Stoykova, A. A. Alatan, P. Benzie, N. Grammalidis, S. Malassiotis, J. Ostermann, S. Piekh, V. Sainov, C. Theobalt, T. Thevar and X. Zabulis, "3-D Time-Varying Scene Capture Technologies—A Survey", IEEE Tr. on CSVT, no 11, vol 17, pp 1568-1586, November 2007 may be employed.

In an embodiment of the invention, the coherent light source (2) includes a plurality of colors and system (1) is configured for color operation in a time-sequential manner or electro-optical capturing device (5) includes color-masked pixels.

In an embodiment of the invention, the system (1) which operates as holographic true 3D display further comprises an opaque mask (8) which is placed right at the focal point of the curved mirror (4).

FIG. 6 is a schematic diagram depicting the system (1) for holographic true 3D display model where a small size opaque mask (8) is placed right at the focal point of the curved mirror (4) to eliminate a potential problem in practical SLM (3) based diffractive optics that is associated with the undesired undiffracted component of the outgoing light. This undiffracted component reveals itself as a bright spot at the focal point of the mirror (4) and this bright spot in the 3D ghost-like image distracts the viewer.

Although the invention discloses a system (1) which defines a holographic true 3D video camera model, capturing is not essential before displaying true 3D images (1) and videos. It is also possible to display computationally generated holographically displayed true 3D videos in an embodiment of the invention. Furthermore, in an embodiment of the invention, it is possible to blend captured scenes by such computationally generated synthetic objects and scenes, again by computational means.

A method (100) for writing fringe patterns on a spatial light modulator (3) comprises the steps of:
  determining light propagation in space from a target object (T) located at a focal point of a curved mirror (4) of the holographic true 3D display and a surface of the curved mirror (4) (101),
  determining the reflection of the propagated light the surface of the curved mirror (4) (102), determining propagation of the reflected light from the surface of the curved mirror (4) to a surface of the spatial light modulator (3) to obtain optical fringe pattern information at the surface of the spatial light modulator (3) (103), writing the optical fringe pattern information onto the spatial light modulator (3) (104).

If the fringe pattern that is written on the SLM (3) is to be obtained by computation using computer (6) and computer generated holography methods, the related computational procedures for the display are outlined as follows:

There are essentially two computational cases: forward case and the inverse case.

In the forward case, the 2D fringe pattern on the SLM (3) is known and the resultant 3D field that corresponds to the true 3D image (I) output is asked. In the inverse case, the 3D field corresponding to the true 3D image (I) is known and the 2D fringe pattern on the SLM (3) is asked. These two problems are essentially reciprocal. Even though it is the inverse case that is related to the display part of the disclosed invention, since the fringe pattern on the SLM (3) should be found to generate a desired 3D field, the forward case helps to clarify the computational steps also for the inverse case; and therefore, both computational procedures are described below.

In the forward case, the field that propagates toward the mirror (4), that is the incident field on the mirror (4), is generated by the SLM (3) via modulation of the incoming illumination from light source (2) as shown in FIG. 1 and FIG. 2. The reflected field from the mirror (4) then propagates away from the mirror (4) surface and generates the desired 3D field, which in turn, yields the ghost-like image. There are four basic stages during the computation: i) the optical field on the SLM (3) exit surface (the given 2D complex valued function), ii) the free space propagation from the SLM (3) to the mirror (4) surface, iii) reflection at the mirror (4) surface, and the iv) final free space propagation from the mirror (4) surface toward the focal point of the mirror (4). Therefore, given the pattern on the SLM (3), the 3D field that represents the true 3D image (I) can be computed by simulating these four optical stages.

Similarly, in the inverse case, knowing the optical properties of the desired 3D scene to be generated, one can start from the corresponding 3D field which would emanate from the mirror (4) and fill the observation space. This field is then back-reflected from the mirror (4) surface, and finally back propagated to the SLM (3) surface to yield the pattern to be written on the SLM (3), all by computational procedures that simulate light propagation and are conducted by computer (6). Simply, given the desired entire 3D field, which represents the ghost-like true 3D image (I), the field on the mirror (4) surface is found by intersecting this 3D field and the mirror (4) surface. By the way, the desired 3D field can be computed if the ghost-like object, or the scene, is known in terms of its structural shape and optical properties. A feasible procedure by computer (6) to compute the field that must be incident on the mirror (4) from the SLM (3) to generate the specified reflected field is to use the local signal decomposition method as in E. Sahin and L. Onural, "Calculation of the Scalar Diffraction Field from Curved Surfaces by Decomposing the Three-dimensional Field into a Sum of Gaussian Beams", JOSA A, vol 30, no 3, pp 527-536, March 2013. Briefly, the desired 3D field is locally decomposed to directional components at a surface point on the mirror (4), as described in the above article with the title of "Calculation of the Scalar Diffraction Field from Curved Surfaces by Decomposing the Three-dimensional Field into a Sum of Gaussian Beams". Each signal component (light beam) after this decomposition represents a specific direction of propagation at that specific mirror (4) point. Therefore, knowing the components of the light distribution right after the reflection and the surface normal at the reflection point, one can find the corresponding signal component (light beam) before the reflection, simply by using the well-known rules of reflection. Collection of all such beams, then, represents the incident field on the mirror (4) surface arriving from the SLM (3). Back propagation of this field on the mirror surface to the SLM (3) surface, as described in the above article with the title of "Calculation of the Scalar Diffraction Field from Curved Surfaces by Decomposing the Three-dimensional Field into a Sum of Gaussian Beams", yields the desired fringe pattern on the SLM (3). There are many algorithms to simulate such back propagation of light, in the state of the art. One of said algorithms is as in L. Onural and H. M. Ozaktas, "Signal Processing Issues in Diffraction and Holographic 3DTV", *Signal Processing: Image Communication*, vol 22, no 2, pp 169-177, February 2007.

Another procedure is to use a point-cloud representation for the object/scene to be generated, and then compute the field to be written on the SLM (3) to generate a single point of the object, by using computer (6). Depending on the position of the point, the form of the SLM (3) pattern will be different, but each such pattern can be computed. Finally, the superposition of all such SLM (3) pattern components will yield the fringe pattern on the SLM (3) that will generate the 3D point-cloud object/scene. These procedures are possible even for arbitrary surface mirrors; in case of practical geometries like a paraboloid or an elliptical mirror surfaces, solutions are easier and analytical solutions can be found.

Figure 10:
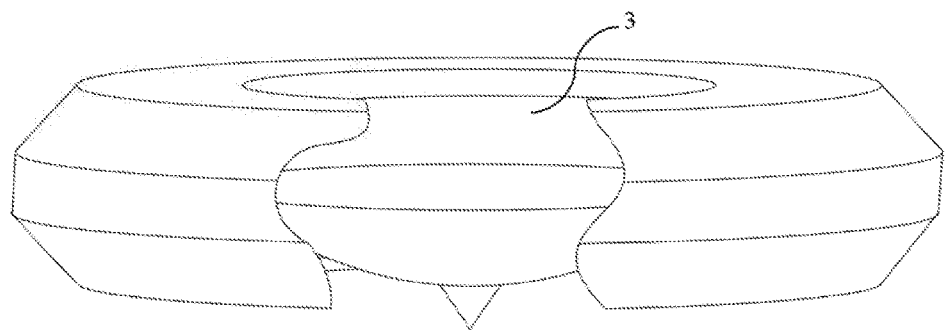
FIG. 10 shows the inside of the geometric shape shown in FIG. 9, Where a single disc shaped LCD display panel is used as SLM.
Figure 11:
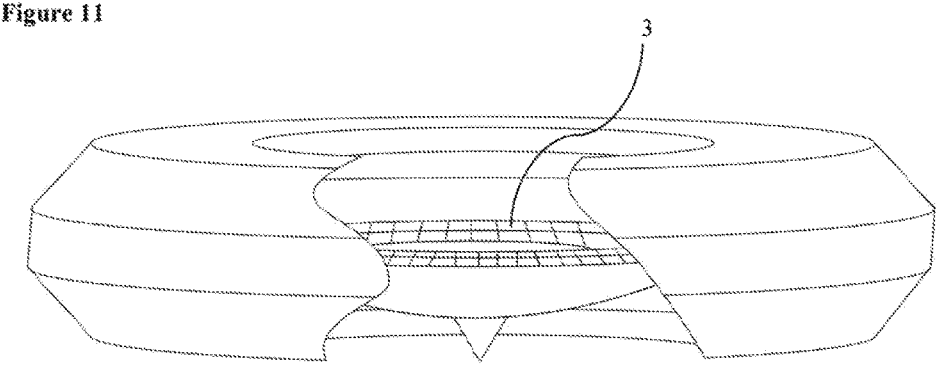
FIG. 11 shows the inside of the geometric shape shown in FIG. 9, where commonly available existing rectangular LCD panels are used to construct the tilted SLM.
Figure 12:
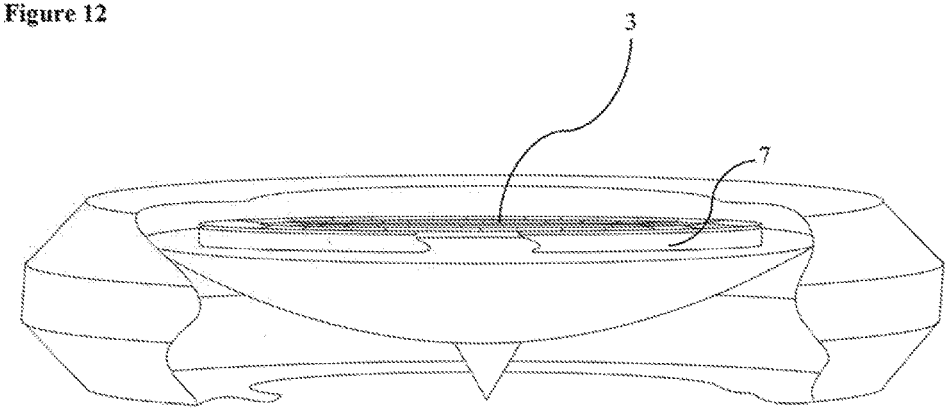
FIG. 12 shows the inside of the geometric shape show in FIG. 9, where commonly available existing rectangular LCD panels are used to construct the SLM.

It can be analytically shown that even if the SLM (3) can only diffract the incident light on it at quite small angles, the resultant image is high quality and visible from a wide range of angles, within the invention. Therefore, a quite feasible SLM (3) can be achieved by using commercially available LCD panels used in commercial LCD displays, in an embodiment of the invention. A possibility is to manufacture a single disc shaped LCD display panel as shown in FIG. 10. Another alternative is to construct the SLM (3) using commonly available existing rectangular LCD panels as shown in FIG. 11 and FIG. 12. Transmissive panels as well as reflective panels, for example based on liquid crystal on silicon (LCoS) technology, can be used. For example, if it is desired to construct the SLM (3) using commercially available common LCD television or other mobile electronic device display panels, even a reverse engineering is possible by removing the back illumination in those commercial displays and by directly illuminating the LCD panel by a collimated plane wave. Many such rectangular panels are needed to cover, and thus obtain, the SLM (3) surface in this holographic 3D display design. High-end commercial LCD panels, in terms of their pixel count (more pixels are desirable), and in terms of their pixel size (smaller pixel sizes are desirable) are needed for better performances. Such a design example corresponds to magnitude-only transmissive SLM (3) modulation. LCoS or similar reflective versions are more suitable for phase-only operation.

For the curved mirror (4), different variants in different embodiments of the invention are all feasible: an ellipsoid mirror can be used, instead of a paraboloid one. A convex mirror can be used instead of a concave one. A convex mirror will yield a true 3D display where the image is seen behind the mirror (virtual true 3D), whereas, for concave mirrors, the viewed true 3D image (I) is a real image in front of the mirror floating in free space.

Figure 5B:
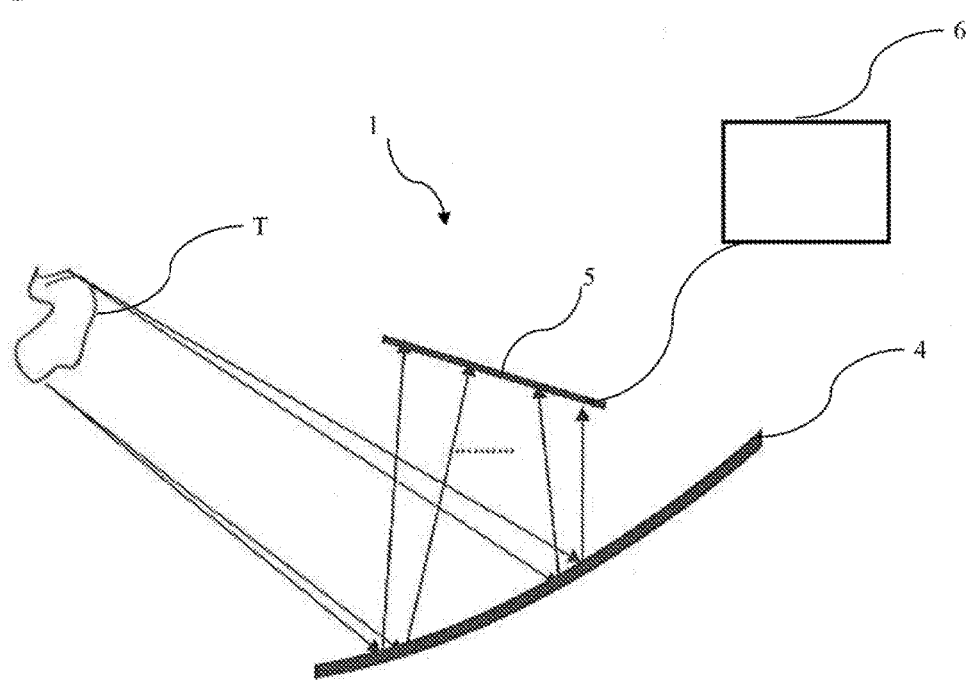
FIG. 5b shows a cross-sectional view of a holographic true 3D video camera in accordance with another embodiment of the invention in which the electro-optical capturing device is tilted.

FIG. 5b is a schematic diagram depicting the cross-section of the system (1) for holographic true 3D video camera model where electro-optical capturing device (5) is tilted with respect to the axis of the curved mirror (4), which allows better viewing angles. In a similar manner, in an embodiment of the invention, the SLM (3) might also be tilted with respect to the axis of the curved mirror (4). Indeed, referring to the two-coupled-mirror device of Mirage®, the disclosed invention works for any shaped surface intersection of the light field between the two mirrors. In the two-coupled mirror device, the 3D light first comes from the physical object, reflects from the mirrors, continues to the other coupled mirror and then converges to form the ghost 3D image as the replica of the object, where the two mirrors, the physical object and the resultant object are all in the physical proximity of the device. Here in this invention, however, what is achieved is a recording of the propagating light from one mirror to the other over an intersecting surface (video camera side), and then, the same distribution over the surface is re-created over the same surface to continue toward the other mirror (display side); but the two mirrors are now physically decoupled, forming the true 3D camera and the display.

Obviously, the planar surface intersecting the 3D light between the two mirrors is the simplest one among all other surfaces in terms of its geometry and in terms of computational complexity. However, it may not be the best one in terms of display quality; indeed, the tilted version, which corresponds to an intersection of the volume by a conic surface, may be desirable due its lower local bandwidth and larger aperture properties.

Figure 7A:
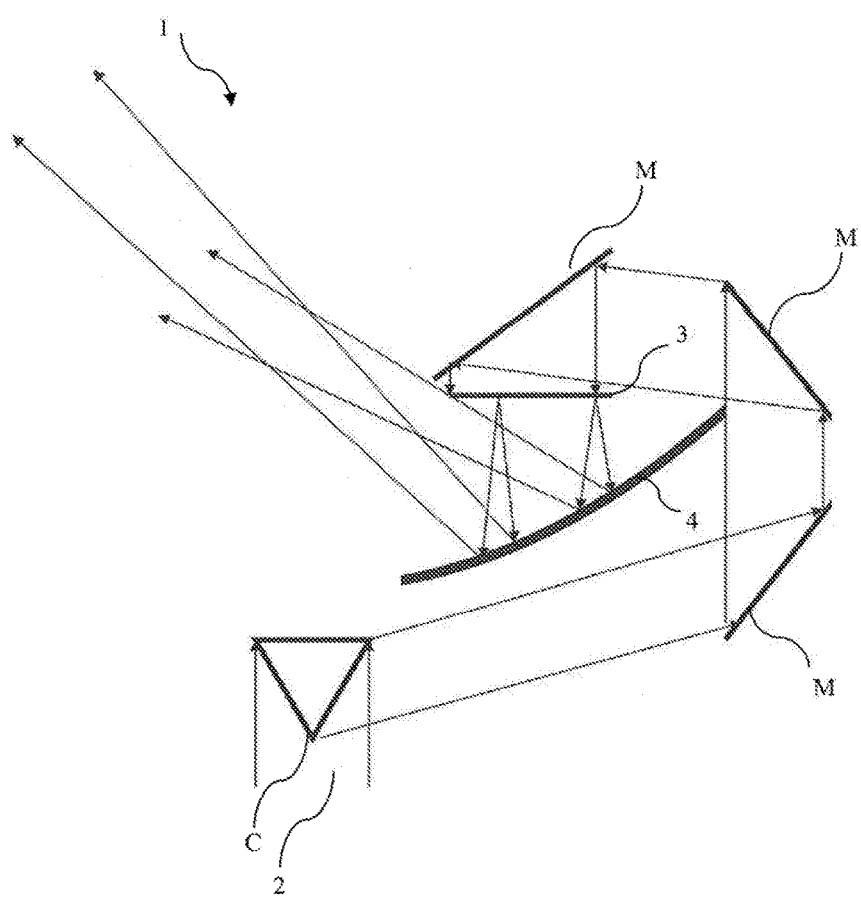
FIG. 7a, FIG. 7b, FIG. 8a and FIG. 8b show cross sectional views of a holographic true 3D display in accordance with different embodiments of the invention, in which a conical mirror is used.
Figure 7B:
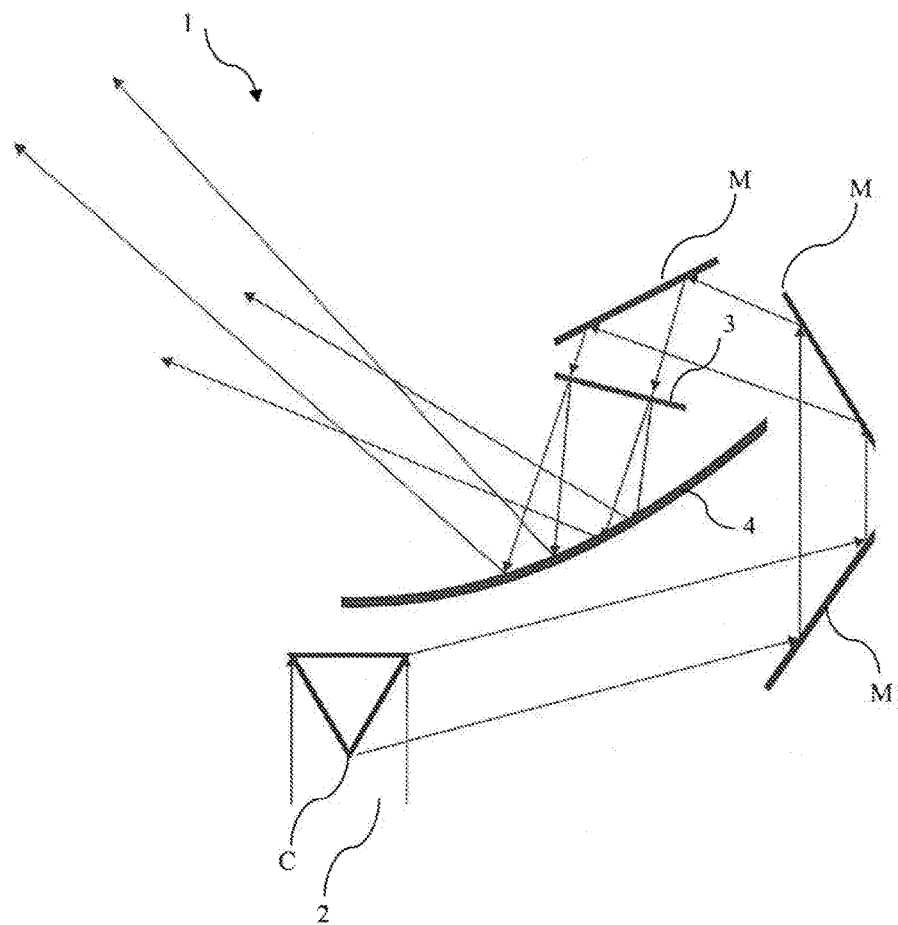
Figure 8A:
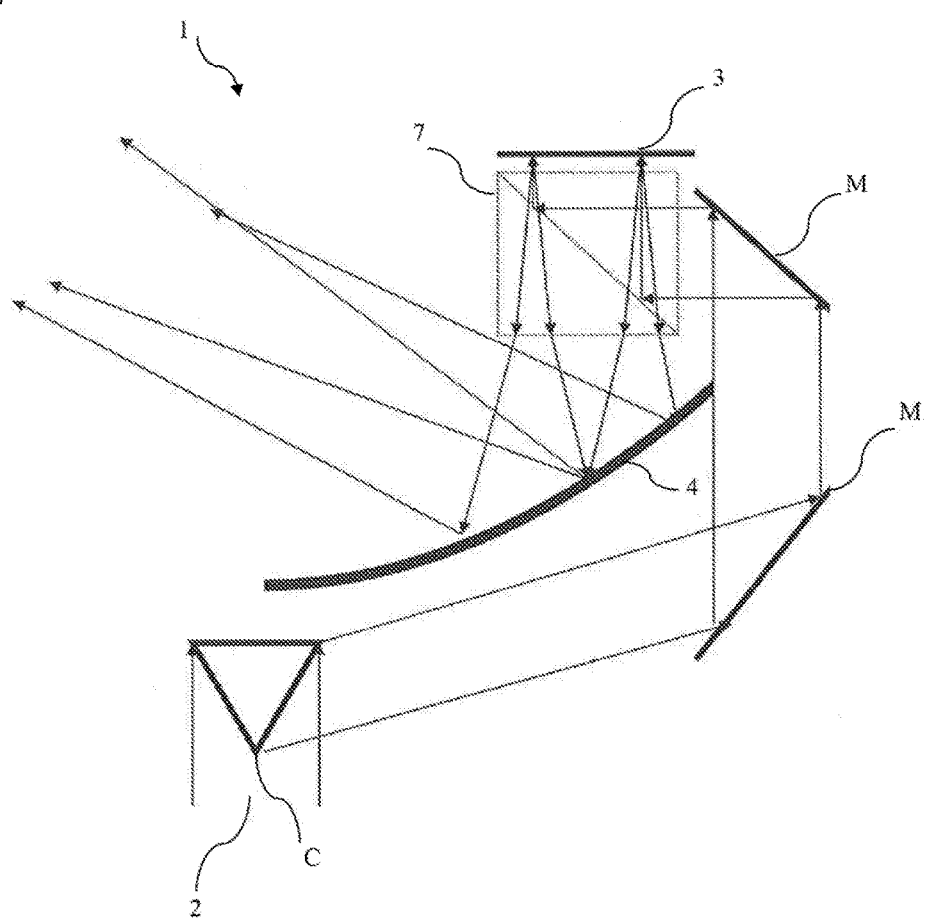
Figure 8B:
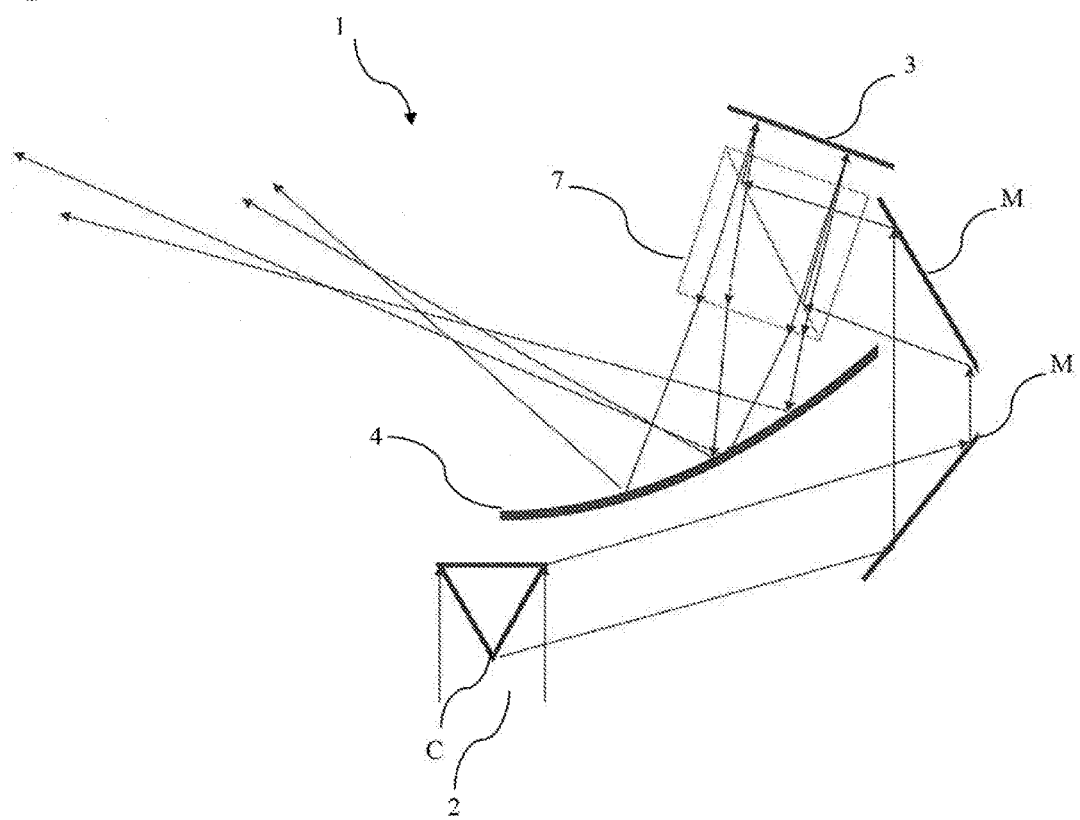
Figure 9:
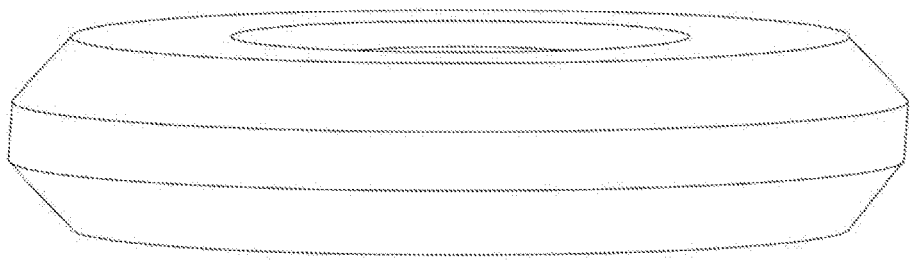
FIG. 9 shows the outer walls of a geometric shape as seen from the outside, in which the invention is placed.

Going back to the planar surface case, the uniform illumination of the SLM (3) that will then diffract the light according to the fringe patterns written on them can be achieved in various ways. A possible geometry is shown in FIG. 7a and FIG. 7b for the transmissive SLM (3) case, and in FIG. 8a and FIG. 8b for the reflective SLM (3) case; in each case, only one side of the 2D cross-section of a 3D circularly symmetric device is shown in the figure. A conic mirror (C) is placed at the center. The incident beam (B) on the conic mirror (C) is a collimated beam; this beam then reflects from the conic mirror (C) and illuminates, in a circularly symmetric fashion, the three mirrors (M) at the outer walls of the display device where the outer walls can be seen from the outside in FIG. 9. The circularly symmetric illumination of a circular set-up by a single incident beam via a conic mirror (C) is described in patent document with the title of "An Apparatus and Methods for Holographic Display" and the publication number of WO/2012/095703. The mirrors (M) at the outer walls are circular mirrors whose shapes are like belts; however, the walls of these circular belts are planar; therefore, technically, these mirrors are also circular sections of conic mirrors (C).

The illumination set up is similar for the reflective SLM (3) case; the additional component is a circular beam splitter (7) which reflects and thus guides the incident beam to the reflective surface of the SLM (3), and then passes the reflected beam towards the paraboloid mirror (4) surface. Such beam splitters (7), usually in cubic shape, are well known and used in practice in the state of the art, for example in A. Ö. Yöntem, L. Onural, "Integral Imaging Using Phase-only LCoS Spatial Light Modulators as Fresnel Lenslet Arrays", JOSA A, vol 28, no 11, pp 2359-2375, November 2011. Circularly shaped version of such a beam splitter (7) is depicted in FIG. 12.

The illumination structure is similar also for the tilted case; the only difference is the relative orientation of the mirror walls and the beam splitter (7) to match the given geometry.

Color true 3D camera and display operation, based on the disclosed principles in this invention, is also possible. As commonly used in projection systems, a possible color operation during the display is achieved by illuminating the SLMs (3) in a time sequential manner by different color light sources (2), frame-by-frame, for example, by red, green and blue lasers. As consecutive colors are used at a rate faster than the human eye can detect the discontinuities (for example, at a rate of 25 full-color frames per second, which is equivalent to 75 single color frames per second), a continuously perceived color operation is achieved.

Time sequential color operation is a well-known color display technology used also in 2D systems. Within this operation, appropriate element of the system (1) is simply illuminated in a time-sequential manner by different main colors, one after another. In an exemplary embodiment of the inventive system (1) which operates as a holographic true 3D display, first the fringe pattern corresponding to the "red" 3D image (I) is written on the SLM (3) and the SLM (3) is illuminated by the "red" light from light source (2); afterwards, the fringe pattern for the "green" 3D image (I) is written on the SLIM (3) and it is illuminated by the "green" light from light source (2); and finally the fringe pattern for the "blue" 3D image (I) is written and illuminated by the "blue" light from the light source (2). This operation is repeated in a continuous fashion. Other main colors and other sequences of colors are also possible. The repetition rates are fast as mentioned above, so that the human eye cannot resolve individual single color projections, but sees a color operation.

An alternative color operation is achieved by using permanent different color masks in front (or back) of each pixel of the SLMs (3), and by illuminating the SLMs (3) by white light, as in many conventional LCD panels used in TV sets. If the color filters are narrow-band in their color spectra, a sufficient coherence for holographic operation at the outgoing light field may still be achieved. However, this method will result in a significant waste of light energy.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A holographic true 3D apparatus displaying a true 3D image, comprising:
   at least one light source for providing a collimated light beam,
   at least one belt-shaped mirror;
   at least one spatial light modulator;
   at least one curved mirror;
   at least one computer;
   wherein:
   the spatial light modulator covers an aperture of the curved mirror as a lid except for an opening to allow an outgoing image-forming light to exit;
   the light which originates from the light source and is reflected by the belt-shaped mirror illuminates the spatial light modulator;
   fringe patterns representing the eventual 3D image are written on the spatial light modulator;

the spatial light modulator modulates light incident onto it according to said fringe pattern;

the light modulated by the spatial light modulator is coupled to the curved mirror and reflects from it to exit from said opening to form a true 3D video image; and the computer drives the spatial light modulator by transferring and writing the fringe patterns to the spatial light modulator.

2. The display apparatus according to claim 1, wherein the spatial light modulator is either a reflective spatial light modulator or a transmissive spatial light modulator.

3. The display apparatus according to claim 2, wherein the spatial light modulator modulates at least one of the magnitude or phase of the light from light source.

4. The display apparatus according to claim 1, comprising a ring-shaped beam splitter which is used to guide the incoming light beam coming from the light source via a conic mirror and circular mirrors to the spatial light modulator.

5. The display apparatus according to claim 4, wherein the beam splitter includes an axis of rotational symmetry for annular shaped illumination of the spatial light modulator.

6. The display apparatus according to claim 1, wherein the spatial light modulator includes color-masked pixels.

7. The display apparatus according to claim 1, wherein the spatial light modulator is illuminated in a time sequential manner by different color light sources at a rate faster than the human eye can detect discontinuities.

8. The display apparatus according to claim 1, wherein the spatial light modulator comprises an array of smaller size spatial light modulators in a tiled manner.

9. The display apparatus according to claim 1, wherein the surface of the spatial light modulator covering the mirror aperture has a shape of a planar or curved surface.

10. The display apparatus according to claim 1, wherein the computer calculates the optical fringe pattern information to be written on the spatial light modulator and writing said pattern information on the spatial light modulator.

11. A method of displaying a true 3D video image, the method, comprising:

reflecting a collimated light beam from a light source by a belt-shaped mirror to illuminate at least one spatial light modulator located to cover an aperture of a curved mirror as a lid except for an opening to allow an outgoing image-forming light to exit;

writing fringe patterns representing the eventual true 3D video image on the spatial light modulator with a computer;

modulating light incident onto the spatial light modulator according to said fringe pattern; and coupling the light modulated by the spatial light modulator to the curved mirror and reflecting from it to exit from said opening to form the true 3D video image.

* * * * *